H. LEHMANN.
RECOIL GUN.
APPLICATION FILED JUNE 23, 1908.

988,791.

Patented Apr. 4, 1911.
6 SHEETS—SHEET 6.

UNITED STATES PATENT OFFICE.

HERMANN LEHMANN, OF MAGDEBURG-SUDENBURG, GERMANY.

RECOIL-GUN.

988,791.　　　Specification of Letters Patent.　　Patented Apr. 4, 1911.

Application filed June 23, 1908. Serial No. 440,014.

*To all whom it may concern:*

Be it known that I, HERMANN LEHMANN, a subject of the Emperor of Germany, King of Prussia, and a resident of Magdeburg-Sudenburg, Germany, have invented certain new and useful Improvements in Recoil-Guns, of which the following is a specification.

The present invention relates to a recoil-gun provided with means for automatically opening and closing the closure.

Three embodiments of the invention are shown in the accompanying drawings, by way of example.

Figures 1, 2, 3, 4:
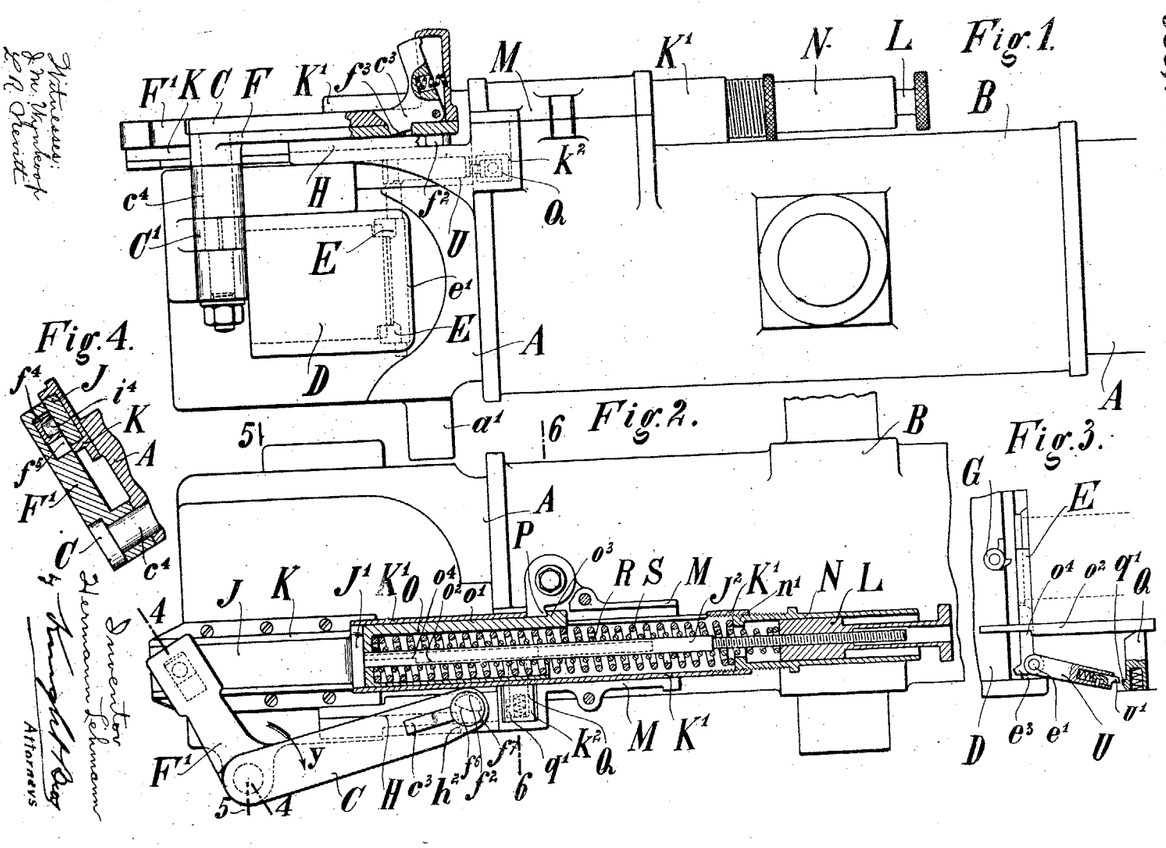
Figure 1 is a side view, partly in section, of the first embodiment, showing those parts of the gun to which the invention relates. The parts are shown in the position which they assume when the gun-barrel is in the firing position and the closure is closed.
Fig. 2 is a top view of Fig. 1, partly in section.
Fig. 3 is a diagrammatic view of some parts of the gun in the position as per Figs. 1 and 2.
Fig. 4 is a section on line 4—4, Fig. 2.
Figure 5:
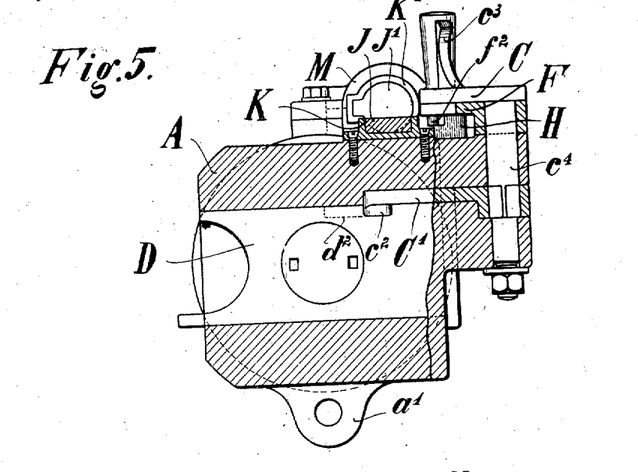
Figs. 5 and 6 are sections on lines 5—5 and 6—6, Fig. 2, looking from the left.
Figure 6:
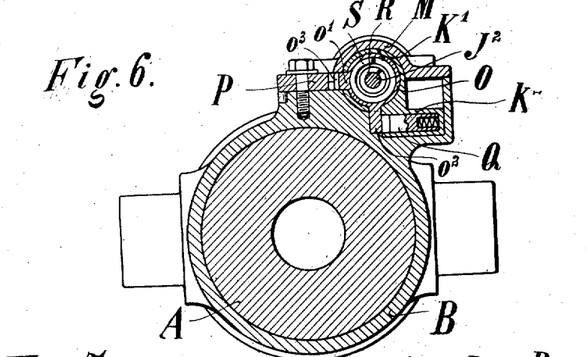
Figure 7:
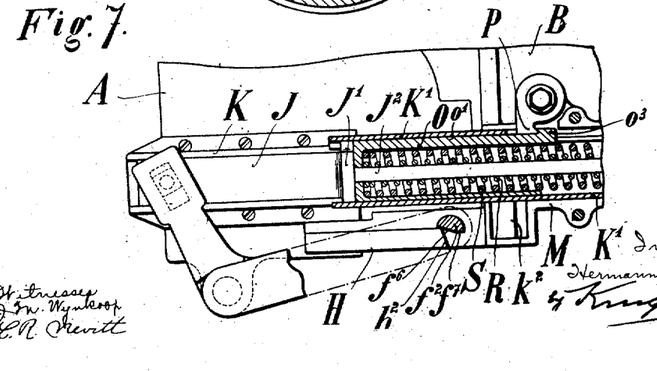
Fig. 7 shows some details in a view corresponding to that shown in Fig. 2; the parts are shown in the position which they assume immediately after the recoil commences.
Figures 8, 9, 10:
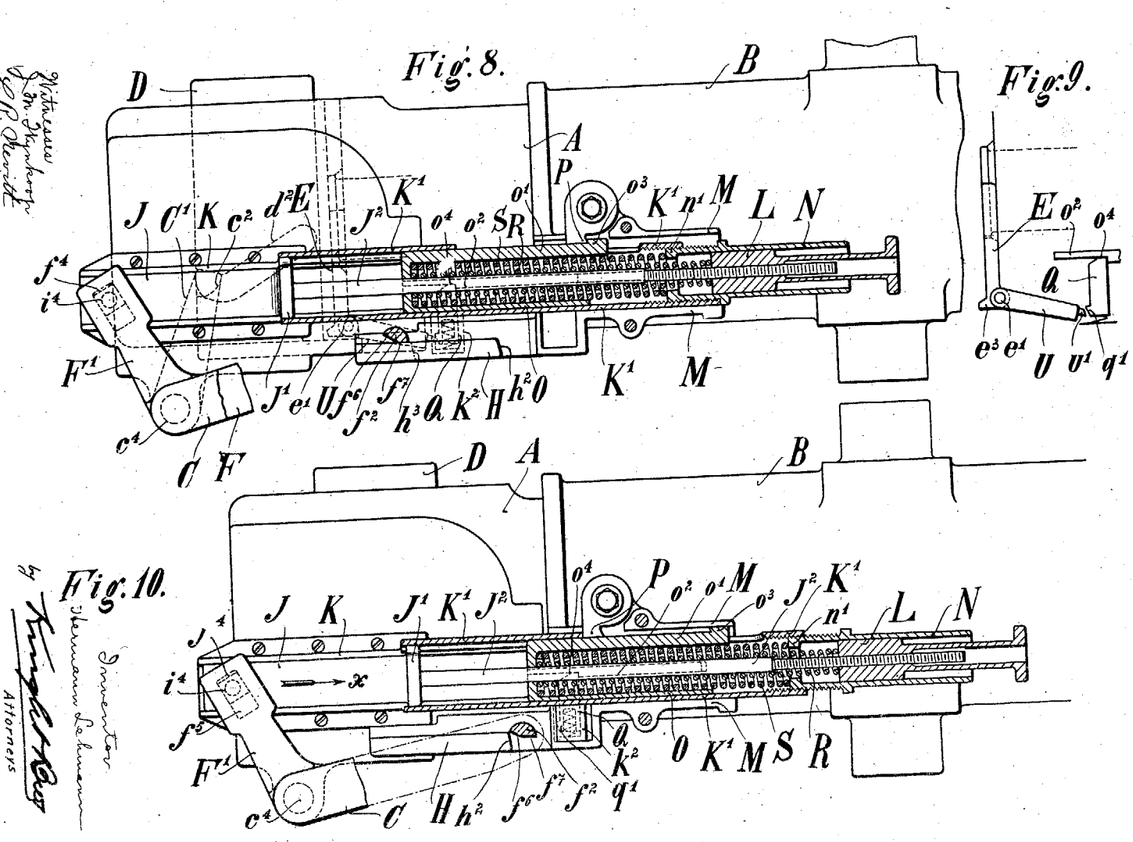
Fig. 8 is a view corresponding to Fig. 2, the parts being shown in the position which they assume at the end of the recoil.
Fig. 9 is a diagrammatic view of some of the parts in the position corresponding to that shown in Fig. 8.
Fig. 10 is a view corresponding to Fig. 2, the parts being shown in the position which they assume when the gun-barrel has nearly completed its return movement.
Figures 11, 12, 13, 14:
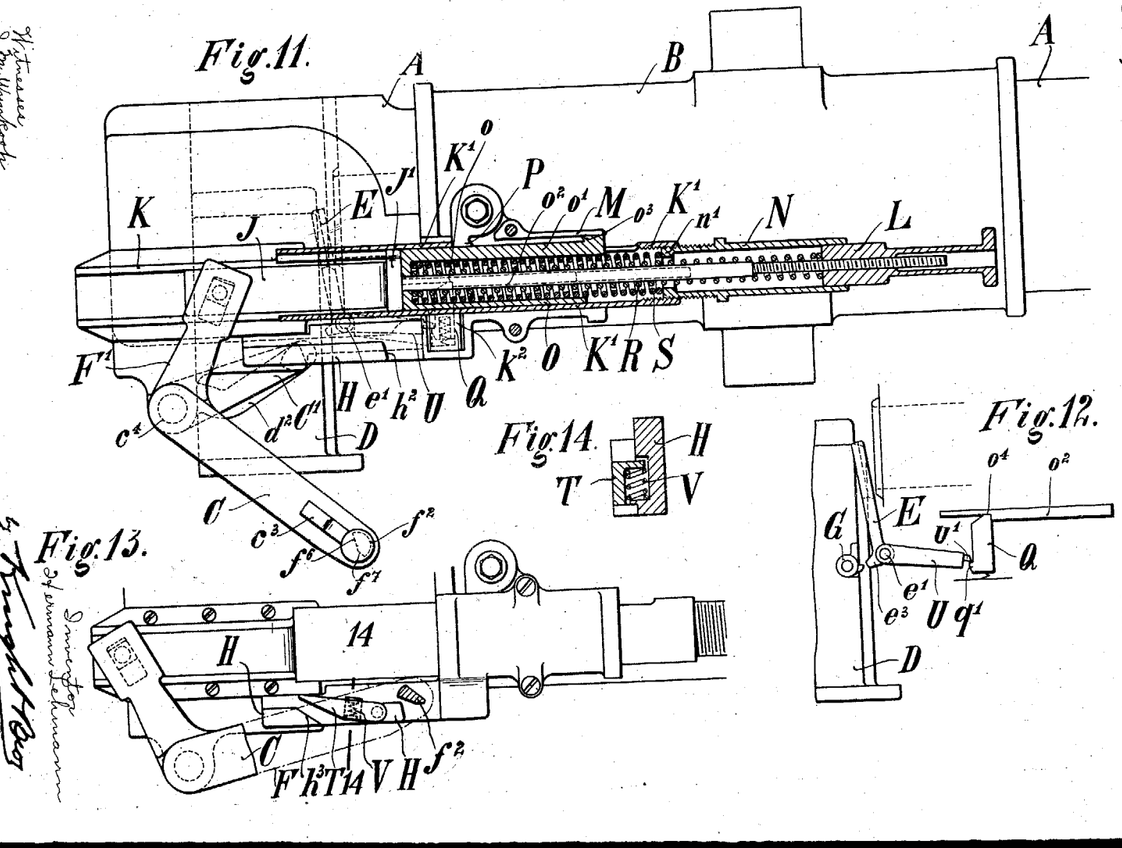
Fig. 11 is a view corresponding to Fig. 2 and showing the parts in the position which they assume when the gun-barrel is in the firing position and the closure is open.
Fig. 12 is a diagrammatic view showing some parts of the gun in a position corresponding to that shown in Fig. 11.
Fig. 13 is a top view of parts of a second embodiment, the gun-barrel being in the firing position and the closure being closed.
Fig. 14 is a section on an enlarged scale, on line 14—14, Fig. 13, looking from the right.
Figure 15:
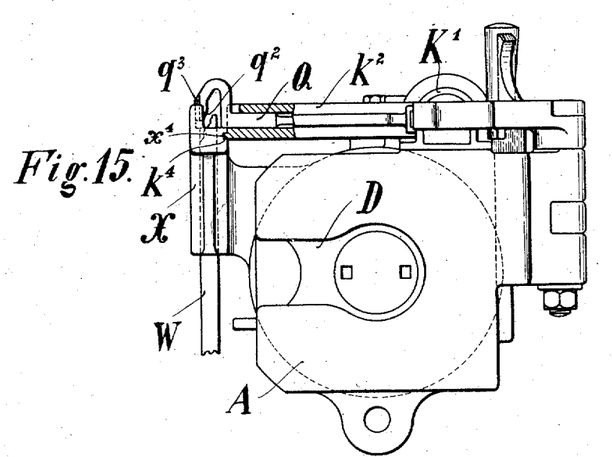
Fig. 15 is a rear view of a third embodiment; the parts are shown in the position which they assume when the gun-barrel is in the firing position and the closure is closed.

Reference will first be had to the embodiment shown in Figs. 1 to 12. The gun-barrel A, which has its horn $a^1$ connected with a recoil-brake and a recuperator, is slidingly mounted in the cradle B. The recoil-brake and the recuperator, which are not shown in the drawings, may be of any suitable known construction. The closure is opened and closed by means of an operating lever $C$ $C^1$ which is journaled in the breech of the gun barrel and which has its arm $C^1$ provided with a heart-shaped stud $c^2$ which engages in a curved groove $d^2$ in the breech-block D (Figs. 5, 8 and 11). The bifurcated ejector E is mounted on a shaft $e^1$ journaled in the breech of the gun-barrel (Figs. 1, 3, 8, 9, 11 and 12). The ejector is provided with cams $e^3$ which are capable of coöperating with trippers G (Figs. 3 and 12) swingingly mounted in the breech-block so as to cause the ejector to be swung outwardly toward the end of the outward movement of the breech-block (Fig. 12). Each tripper G is under the action of a spring (not shown) which tends to hold the tripper in the position shown in Figs. 3 and 12. The mechanism so far referred to is old and, therefore, need not be described in detail. A bell-crank lever $F$ $F^1$ is loosely and rotatably mounted on the shaft $c^4$ of the operating lever $C$ $C^1$. When the gun is to work automatically the arm F of the bell-crank lever is coupled to the arm C of the operating lever. For that purpose the arm F of the bell-crank lever is provided with a recess $f^3$ (Fig. 1) in which can engage a spring-pressed locking bolt $c^3$ which is mounted in the operating lever. The locking bolt $c^3$ is formed as a bell-crank lever and is mounted in such a manner that it can be withdrawn from the recess $f^3$ by the pressure of the hand of the operator when he grasps the handle of the operating lever. On its lower side the lever-arm F is provided with a projection $f^2$ which, during the recoil and return movement of the gun-barrel, can slide along a guide-rail H (Figs. 7 and 8) which is rigidly connected to the cradle B. During the movements of the gun-barrel the guide-rail prevents the operating lever from swinging outwardly and thus prevents the closure being opened. The projection $f^2$ is provided with an inclined face $f^6$ the object of which will be explained later on. The arm $F^1$ of the bell-crank lever F $F^1$ is connected to a slide J which is capable of sliding on a straight track K which is of trough shaped cross-section and is secured to the breech of the gun-barrel. For that purpose the arm $F^1$ has a small slide $f^4$ movably arranged in a guide $f^5$ and engaging a pin $i^4$ on the slide J (Fig. 4). The slide J, which is of rectangular cross-section, goes over into a cylindrical piston $J^1$ which is continued in a rod $J^2$ on the free end of which is screwed a cylindrical nut L. The trough shaped cross-section of the track K also goes over into a cylindrical cross-section to correspond to the shape of the parts, J and $J^1$. The latter part ($K^1$) of the track projects over the cradle and is supported by a bearing M which is mounted on the cradle and in which the part $K^1$ is capable of sliding during the recoil and return movement of the gun-barrel. Into the free end of the part $K^1$ of the track is screwed a tube N which serves as guide for the nut L of the rod $J^2$ during the relative movement of the parts J $J^1$ $J^2$. In a part $K^1$ of the track is furthermore slidingly mounted a hollow cylinder O which is closed at one end. The end wall of the cylinder, which is provided with a bore for the rod $J^2$ (Figs. 2, 7, 8, 10 and 11), serves as abutment for two spiral springs R and S, one of which is arranged within the other. The inner spring (R) serves for opening the closure and the outer spring (S) serves for closing the closure. The nut L forms the other abutment for the opening spring R and an annular projection $n^1$ on the tube N forms the other abutment for the closing spring S. As will be seen from the drawings the distance between these two abutments and the end wall of the cylinder O may be varied by turning the tube N relatively to the guide-cylinder $K^1$ or by turning the nut L relatively to the rod $J^2$. Each of the springs is therefore capable of adjustment of its compression independently of the other spring. The cylinder O is provided on its exterior with two ribs $o^1$ and $o^2$ which project through the cylindrical wall of the guide-cylinder $K^1$ (Fig. 6). The rib $o^1$ is provided with a cam $o^3$ (Figs. 2, 6, 7, 10 and 11) which is adapted to coöperate with a stop P which is secured on the cradle B and is located in the path of movement of the cam $o^3$. The rib $o^2$ is provided with a notch $o^4$ into which a spring-pressed bolt Q can snap at the end of the recoil, the bolt Q being mounted in a projection $k^2$ on the part $K^1$ of the track (see especially Figs. 2, 3, 8 and 9). In order to make it possible to withdraw the bolt Q from the notch $o^4$ a lever U is secured on the ejector-shaft $e^1$ (Figs. 1, 3, 8, 9, 11 and 12) which lever, when the ejector E swings outwardly, is capable of having a spring-pressed cam $u^1$ engage behind a cam $q^1$ arranged on the bolt Q (Fig. 12).

Directly before the shot is fired the several parts assume the position shown in Figs. 1 to 6. The gun-barrel A is then in its foremost position relatively to the cradle B. The closure is closed. The levers C $C^1$ and F $F^1$ are coupled together through the medium of the locking bolt $c^3$; the projection $f^2$ on the lever F $F^1$ assumes such a position relatively to the guide-rail H that the projection $f^2$ can swing past the front face of the guide-rail H when the levers C $C^1$ and F $F^1$ are turned. The springs R and S are under initial compression; the cam $o^3$ of the cylinder O engages with the stop P. After the gun is fired the gun-barrel recoils on the cradle. The track K $K^1$ N which is secured on the gun-barrel recoils with the barrel, while the cylinder O is held from movement by reason of the engagement of the cam $o^3$ with the stop P. Compression is thereby imparted to the closing spring S. The parts J $J^1$ $J^2$ L which are guided in the track K $K^1$ N tend to recoil with the track as they resist displacement relatively to their guides by reason of their connection with the operating lever C $C^1$ of the closure and by reason of the friction in the guides K $K^1$ N. However, the initial compression of the opening spring R is so strong that it overcomes these resistances and holds the piston $J^1$ in abutment with the cylinder O. The shaft $c^4$ of the bell-crank lever F $F^1$ and of the operating lever C $C^1$, which shaft is journaled in the breech, must, however, recoil with the gun-barrel and the levers F $F^1$ and C $C^1$ will therefore turn in the direction of the arrow $y$ (Fig. 2). This turning movement is, however, stopped immediately after having started, as the projection $f^2$ of the lever-arm F cannot any more swing past the front face $h^2$ of the guide-rail because the gun-barrel, during this turning movement, has moved so far backward that the inclined face $f^6$ of the projection $f^2$ comes into abutment with the guide-rail H. At that moment the parts assume the position shown in Fig. 7. During the further recoil movement of the barrel the levers F $F^1$ and C $C^1$ will first be turned back into their original position through coöperation of the inclined face $f^6$ and the guide-rail H. Thereupon the projection $f^2$ slides with its face $f^1$ along the guide-rail H and, during the further recoil movement, the levers C C¹ and F F¹ are, therefore, prevented from swinging out and the parts J J¹ J² L are obliged to partake of the recoil of the gun-barrel. The opening spring R will thereby also be compressed during the recoil. When the gun-barrel has completed its recoil movement, that is when the parts assume the position shown in Fig. 8, the bolt Q snaps into the notch $o^4$ of the cylinder O (Figs. 8 and 9). During the return movement of the barrel the bolt Q carries the cylinder O along. The projection $f^2$ slides along the guide-rail H. The springs R and S remain compressed. When the gun-barrel has reached its foremost position (Fig. 10) the projection $f^2$ slides off the guide-rail H. The opening spring R thereupon expands and moves the rod J², the piston J¹ and the slide J relatively to the track N K¹ K and the gun-barrel, in the direction of the arrow $x$ (Fig. 10). The bell-crank lever F F¹ and the operating lever C C¹ coupled thereto are thereby turned in such a manner that the breech-block is moved outwardly (Fig. 11). Toward the end of this movement the breech-block D, through the medium of its trippers G, swings the ejector E and the lever U arranged on the ejector-shaft $e^1$ from the position shown in Figs. 8 and 9 to the position shown in Figs. 11 and 12. This causes the ejector to eject the cartridge and the spring-pressed cam $u^1$ of the lever U moves behind the cam $q^1$ of the bolt Q. The several parts then assume the relative position shown in Figs. 11 and 12. When loading takes place the ejector E is swung back into its original position by the base-rim of the cartridge-shell. The lever U partakes of the turning movement of the ejector and withdraws the bolt Q from the notch $o^4$, whereby the cylinder O is released and the spring S can expand. While expanding, the spring S returns the cylinder O and through the latter also the piston J¹ and the slide J to the position shown in Fig. 2 whereby the closure is closed through the medium of the lever F F¹ and the operating lever C C¹. During the inward movement of the breech-block the trippers G yield to the cams $e^3$ of the ejector and after passing the cams the trippers are immediately returned to their position of rest by their springs. The compression of the opening spring R has not been subjected to any change during the closing of the closure, as there has been no change in the distance between its two abutments (the end wall of the cylinder O and the nut L) during the displacement of the parts in the cylinders K¹ N. When the closure is closed the several parts again assume the position shown in Figs. 1 to 6.

The herein-described device is especially distinguished by easy inspection of the working parts. As compared with other barrel-recoil guns in which the closing or the opening of the closure or both the opening and the closing is effected by the movement of the gun barrel the gun according to the present invention presents the advantage that the opening and closing of the closure takes place when the gun barrel is in the position of rest. However, the most important advantage of the invention is that the force with which the opening and closing takes place is entirely independent of the velocity of the recoil and return movement of the gun-barrel, which velocity is subject to variations so as to be greater during one firing than during another firing. The fact that the opening and closing of the closure is independent of the velocity of the gun-barrel provides for a more uniform working of the gun and less strain on the parts of the closure. The fact that the two springs are independent of one another has furthermore the advantage that it is possible to impart to each of the springs the exact compression required for the work to be performed by the spring and that each spring can be subsequently compressed independently of the other spring.

If the closure is to be operated by hand the operator proceeds as in an ordinary manually operated closure with operating lever, that is the operator grasps the handle of the operating lever C C¹ and turns it in the direction of the arrow $y$ (Fig. 2) and back into the original position. The pressure of the hand on the handle causes the locking bolt $c^3$ to become withdrawn from the recess $f^3$ of lever-arm F and the operating lever thus becomes uncoupled from the device for automatically opening and closing the closure, which device therefore remains in the position shown in Figs. 1 and 2. To operate the closure by hand it is therefore merely necessary to use the force required for operating an ordinary closure with operating lever. If the operator, after the closure has been closed, lets go his hold on the handle of the operating lever the locking bolt $c^3$ again snaps into the recess $f^3$ and causes the operating lever C C¹ to be coupled to the device for the automatic opening and closing of the closure.

A look at Fig. 8 will show that in this embodiment it is also possible to automatically open the closure at the end of the recoil. This is possible if the guide-rail H, reckoned from the face $h^2$, extends only to the face $h^3$ indicated in Fig. 8. In this case the closure can open when, on recoil, the projection $f^2$ of the lever-arm F reaches the position shown in Fig. 8 relatively to the guide-rail H.

In the embodiment shown in Figs. 13 and 14 the closure is opened during the return movement of the barrel. For that purpose a deflector T is mounted in the guide-rail H, the deflector being held by a spring V in the position shown in the drawing. When the gun-barrel recoils the projection $f^2$ of the lever-arm F slides along the guide-rail H and forces the deflector backward so as to cause the point of the deflector to abut against the inclined face $h^3$ of the guide-rail. Directly after the projection $f^2$ has passed the deflector T the spring V returns the deflector to the position shown in the drawing. During the return movement of the gun-barrel the projection $f^2$ enters the passage between the inclined face $h^3$ and the deflector and the operating lever C C$^1$ is therefore free to move outwardly under the influence of the opening spring to open the closure. In other respects the construction and mode of operation of this embodiment are identical to those of the embodiment shown in Figs. 1 to 12.

Figure 16:
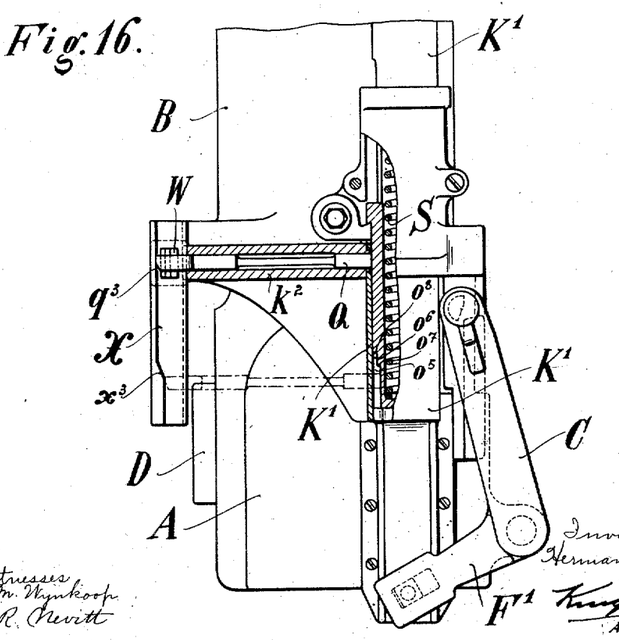
Fig. 16 is a top view of Fig. 15, partly in section.
Figures 17, 18, 19, 20, 21:
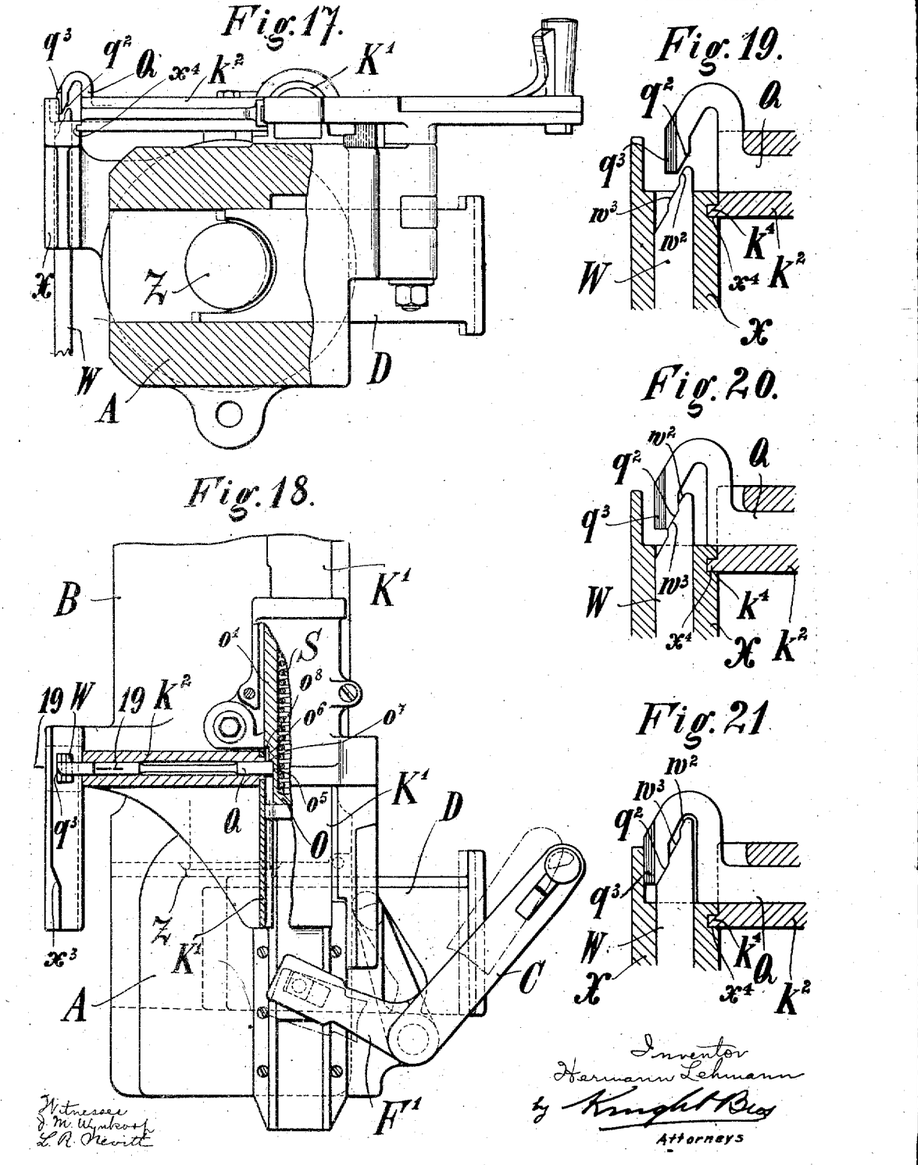
Fig. 17 is a view corresponding to that shown in Fig. 15 and partly in section, the parts being shown in the position which they assume when the gun-barrel is in the firing position and the closure is open.
Fig. 18 is a top view of Fig. 17, partly in section.
Fig. 19 is a section on an enlarged scale, on line 19—19, Fig. 18, looking from below.
Figs. 20 and 21 are views corresponding to Fig. 19, but showing the parts in other relative positions.

The embodiment shown in Figs. 15 to 21 is adapted for use in a gun in which the loading takes place automatically. This embodiment differs from the first-described embodiment as regards the arrangement and shape of the bolt Q and the notch of the cylinder O coöperating therewith and also as regards the means through which the bolt Q and the corresponding notch are brought into and out of engagement. The rib $o^2$ of the cylinder O of the first-described embodiment is not present in this embodiment. The rib $o^1$ is provided with two notches $o^5$ and $o^6$ of different depth which extend in continuation of each other (Figs. 16 and 18). The bolt Q which coöperates with the notches $o^5$ and $o^6$ is arranged in a projection $k^2$ on the cylinder K$^1$ which projection extends beyond the cradle B. The bolt Q has one end bent to form a hook. An inclined face $q^2$ provided on the inner side of the hook of the bolt Q can coöperate with two inclined faces $w^2$ $w^3$ on a rod W which is mounted to slide vertically in a guide-arm X arranged on the cradle B. On its outer side the hook of the bolt Q is provided with an inclined face $q^3$, which is adapted to coöperate with an inclined face $x^3$ on the guide-arm X. In other respects the construction of this embodiment is identical with that of the first-described embodiment. Before firing takes place the parts assume the position shown in Figs. 15 and 16. After the gun is fired the gun-barrel A recoils on the cradle B, and the opening and closing springs, of which only the closing spring S is shown in the drawing, are thereby compressed in the manner already described. The projection $k^2$, which is provided on the guide-cylinder K$^1$ and in which is arranged the bolt Q, recoils with the gun-barrel, the projection $k^2$ being guided in its movement by having a rail $k^4$ engaging in a groove $x^4$ in the guide-arm X. Toward the end of the recoil the inclined face $q^3$ hits the inclined face $x^3$ and slides along thereon. The bolt Q is thereby shifted in such a manner as to assume the position indicated in dotted lines in Fig. 16 at the end of the recoil. In this position the bolt Q abuts against the bottom of the notch $o^5$. On the return to battery the bolt Q comes first into abutment with the face $o^7$ of the notch $o^5$ and carries the cylinder O along in the manner already described. When the return movement is completed the closure is opened and a fresh cartridge is introduced in the gun-barrel through the medium of means which are not illustrated in the drawings. At that moment the parts assume the position shown in full lines in Figs. 17 to 19. Directly thereafter a part of the device which effects the automatic loading elevates the rod W from the position shown in Fig. 19 to that shown in Fig. 20. While this takes place the inclined face $w^2$ of the rod slides along on the inclined face $q^2$ of the bolt and the bolt Q is thereby withdrawn from the notch $o^5$ and becomes located on level with the bottom of the notch $o^6$. The closing spring S therefore commences to expand and commences to close the closure. This closing movement is, however, very soon interrupted because the wall $o^8$ of the notch $o^6$ strikes the bolt Q whereby the cylinder O is again locked in position. The breech-block has then been moved so far into the breech as to just cover the rim of the cap Z of the cartridge (see the positions of the breech-block D and the lever-arms C and F$^1$ indicated in dotted lines in Figs. 17 and 18). A part of the loading device thereupon further elevates the rod W so as to cause the rod to assume the position shown in Fig. 21. While this takes place the inclined face $w^3$ slides along on the inclined face $q^2$ so as to cause the bolt Q to be withdrawn from the notch $o^6$. The closing spring S then further expands and completely closes the closure. After the rod W has been lowered to its original position (Fig. 15) by a part of the loading device the several parts again assume the position shown in Figs. 15 and 16. Due to the fact that the closure, directly after the insertion of the cartridge, closes to such an extent that the breech-block just overlaps the rim of the cartridge the rammer, which effects the introduction of the cartridge into the gun-barrel, is free to be withdrawn out of the path of the breech-block; on the other hand the cartridge is prevented from dropping out when the rammer is withdrawn. When the gun-barrel is adjusted to high elevations the cartridge might easily drop out from its seat after the rammer has moved away from the cartridge if the breech-block did not engage behind the cartridge.

Having thus described the invention, what is claimed and desired to be secured by Letters Patent is:

1. The combination with a recoil gun, of means for automatically opening and closing the closure thereof comprising two accumulators adapted to be tensioned directly by and on the recoil movement of the gun barrel, means for holding the accumulators under tension, means whereby one of the accumulators is caused to open the closure, and means whereby the other accumulator is caused to close the closure.

2. The combination with a recoil gun, of means for automatically opening and closing the closure thereof comprising two accumulators adapted to be tensioned directly by and on the recoil movement of the gun barrel, means for holding said accumulators under tension during the counter recoil movement of the gun barrel, means whereby one of the accumulators is caused to open the closure after the gun barrel has completed its counter recoil, and means whereby the other accumulator is caused to close the closure.

3. In a recoil gun, the combination with the gun barrel and the breech closure, of a pair of accumulators adapted to be energized by the recoil movement of the gun, means for locking said accumulators during the return movement, said means being adapted to release one of the accumulators to open the closure at the completion of the return movement; and means connected with the other accumulator whereby it is released to close said closure, said last named means being operated by the introduction of a fresh shell.

4. In a recoil gun, the combination with the gun barrel and the breech closure, of accumulators for storing energy derived from the recoil movement of the gun, each of said accumulators being operatively connected with the breech-closure; a separate detent mechanism adapted to automatically lock each of said accumulators at the end of the recoil movement; one of said detent mechanisms being further adapted to release one of said accumulators at the end of the return movement; and means operated by the ejector for releasing the other accumulator.

5. In a recoil gun, the combination with a breech closure block; of a lever by means of which said block is thrown from its closed to its open position and back again; a slide for actuating said lever; and two accumulators operatively connected with said slide, one of said accumulators being adapted to move the slide in one direction to open the breech and the other accumulator being adapted to move the slide in the opposite direction to close the breech.

6. In a recoil gun, the combination with the gun-barrel and the breech closure, of a pair of accumulators, means whereby energy is stored in the accumulators by the recoil movement of the gun-barrel, comprising a connection between the accumulators and the breech closure constructed to cause one of the accumulators to open the closure and the other accumulator to close the closure, and a locking means for each of said accumulators adapted to be released successively to permit the accumulators to act.

7. In a recoil gun, the combination with the gun-barrel and the breech closure, of a pair of accumulators, means whereby energy is stored in the accumulators by the recoil movement of the gun-barrel, comprising a connection between the accumulators and the breech closure constructed to cause one of the accumulators to open the closure and the other accumulator to close the closure, and a locking means for each of said accumulators adapted to be released successively to permit the accumulators to act; one of said locking means being adapted to be released automatically at the end of the return movement of the gun-barrel and the other locking means being adapted to be released by the insertion of a cartridge in the gun-barrel.

8. In a recoil gun, the combination with the gun-barrel and the breech closure, of a pair of springs under compression independently operative one to perform the functions of opening and the other, the functions of closing the closure, and means for adjusting the compression of said springs independently of each other.

9. In a recoil gun, the combination with the gun-barrel, the breech closure and the operating lever for the breech closure, of a pair of accumulators, means whereby energy is stored in said accumulators by the recoil movement of the gun-barrel, comprising a connection between the accumulators and the operating lever whereby one of the accumulators actuates the operating lever to open the breech and the other accumulator actuates the operating lever to close the breech, a member secured on a non-recoiling part of the gun, and a member connected to the operating lever and adapted to enter into engagement with said first-named member on recoil to prevent movement of the operating lever to open the breech.

10. In a recoil gun, the combination with the gun-barrel, the breech closure and the operating lever for the breech closure, of a pair of accumulators, means whereby energy is stored in said accumulators by the recoil movement of the gun-barrel, comprising a connection between the accumulators and the operating lever whereby one of the accumulators actuates the operating lever to open the breech and the other accumulator actuates the operating lever to close the breech, a member secured on a non-recoiling part of the gun, and a member connected to the operating lever and adapted to enter into engagement with said first-named member on recoil to prevent movement of the operating lever to open the breech; said first-named member being constructed to remain in engagement with the member of the operating lever during the recoil and return movement of the gun-barrel.

11. In a recoil gun, the combination with the gun-barrel, the breech closure, the operating lever and the shaft of the operating lever, of a pair of accumulators, means whereby energy is stored in said accumulators by the recoil movement of the gun-barrel, comprising a second lever loosely mounted on the shaft of the operating lever, means for coupling said second lever to the operating lever, and a connection between the accumulators and said second lever whereby one of the accumulators acts on the levers to open the closure and the other accumulator acts on the levers to close the closure.

The foregoing specification signed at Magdeburg, Germany, this 6 day of June, 1908.

HERMANN LEHMANN.

In presence of—
 RUDOLF BAUMGARTH.
 GUSTAV BAUMGARTH.